United States Patent
Cruz Tejedor et al.

(10) Patent No.: US 11,421,104 B2
(45) Date of Patent: *Aug. 23, 2022

(54) HYDROGENATED RUBBER WITH IMPROVED PERFORMANCE IN TPE COMPOSITIONS

(71) Applicant: DYNASOL ELASTÓMEROS S.A., Madrid (ES)

(72) Inventors: María Ángela Cruz Tejedor, Madrid (ES); Luisa María Fraga Trillo, Madrid (ES); Inés Alonso Zapirain, Madrid (ES)

(73) Assignee: DYNASOL ELASTÓMEROS S.A., Madrid (ES)

( * ) Notice: Subject to any disclaimer, the term of this patent is extended or adjusted under 35 U.S.C. 154(b) by 28 days.

This patent is subject to a terminal disclaimer.

(21) Appl. No.: 16/952,454

(22) Filed: Nov. 19, 2020

(65) Prior Publication Data

US 2021/0070981 A1 Mar. 11, 2021

Related U.S. Application Data

(63) Continuation of application No. 15/746,601, filed as application No. PCT/EP2016/067409 on Jul. 21, 2016, now Pat. No. 10,865,301.

(30) Foreign Application Priority Data

Jul. 24, 2015 (EP) ..................................... 15382385

(51) Int. Cl.

| | | |
|---|---|---|
| *C08L 53/02* | (2006.01) | |
| *C08F 297/04* | (2006.01) | |
| *C08F 8/04* | (2006.01) | |
| *C08K 5/00* | (2006.01) | |
| *C08L 23/12* | (2006.01) | |
| *C08K 5/01* | (2006.01) | |

(52) U.S. Cl.
CPC .............. *C08L 53/025* (2013.01); *C08F 8/04* (2013.01); *C08F 297/044* (2013.01); *C08K 5/0016* (2013.01); *C08K 5/01* (2013.01); *C08L 23/12* (2013.01); *C08F 2800/20* (2013.01); *C08L 2203/02* (2013.01); *C08L 2203/10* (2013.01); *C08L 2207/04* (2013.01)

(58) Field of Classification Search
CPC .. C08F 297/00; C08F 297/02; C08F 297/023; C08F 297/026; C08F 297/04; C08F 297/042; C08F 297/044; C08F 297/046; C08F 297/048; C08F 297/06; C08F 297/08; C08F 297/083; C08F 297/086; C08F 8/04; C08F 2800/20; C08L 2207/04
See application file for complete search history.

(56) References Cited

U.S. PATENT DOCUMENTS

| | | | | |
|---|---|---|---|---|
| 3,699,184 | A * | 10/1972 | Taylor | ..................... C08L 53/02 525/286 |
| 4,107,236 | A * | 8/1978 | Naylor | ................. C08G 81/021 525/122 |
| 5,191,024 | A | 3/1993 | Shibata et al. | |
| 5,609,962 | A * | 3/1997 | Ouhadi | .................... C08L 23/02 156/331.7 |
| 5,969,034 | A * | 10/1999 | Modic | ................... C08L 53/025 524/504 |
| 2007/0232747 | A1* | 10/2007 | Maris | ..................... C08L 53/025 524/505 |
| 2008/0161485 | A1* | 7/2008 | Suzuki | ....................... C08F 8/04 525/332.9 |
| 2009/0163361 | A1 | 6/2009 | Handlin, Jr. et al. | |
| 2012/0136114 | A1* | 5/2012 | Nishikawa | ............... C08K 5/01 525/332.9 |
| 2012/0270991 | A1* | 10/2012 | Fraga Trillo | .......... C08F 293/00 524/505 |
| 2014/0102930 | A1 | 4/2014 | Sasaki | |

FOREIGN PATENT DOCUMENTS

EP 2489688 1/2015

* cited by examiner

*Primary Examiner* — Christopher M Rodd
(74) *Attorney, Agent, or Firm* — Carmody Torrance Sandak & Hennessey LLP

(57) ABSTRACT

New hydrogenated styrenic block copolymers, in particular styrene-ethylene/butylene-styrene copolymers (SEBS copolymers), with improved performance in thermoplastic elastomer compositions (TPE compositions), process for preparing said hydrogenated styrenic block copolymers, reprocessable TPE-S compositions made thereof, method for producing an article from said reprocessable TPE-S compositions and articles made of said reprocessable TPE-S compositions, in particular suitable for medical applications.

12 Claims, No Drawings

HYDROGENATED RUBBER WITH IMPROVED PERFORMANCE IN TPE COMPOSITIONS

FIELD OF THE INVENTION

The present invention relates to new hydrogenated styrenic block copolymers, in particular styrene-ethylene/butylene-styrene copolymers (SEBS copolymers), with improved performance in thermoplastic elastomer compositions (TPE compositions), namely in terms of processability, resealability, permeability, hardness, chemical resistance, resistance to sterilisation, oil bleeding and puncture resistance, to a process for preparing said hydrogenated styrenic block copolymers, to reprocessable TPE-S compositions made thereof, to a method for producing an article from said reprocessable TPE-S compositions and articles made of said reprocessable TPE-S compositions, in particular suitable for medical applications.

BACKGROUND

Since their appearance approximately 40 years ago, TPEs have become a widely known family of elastic, flexible polymers that exhibit similar physical properties to elastomers, but which are recyclable and easier to process.

TPEs are easier to process than elastomers because they are crosslinked by non-covalent bonds (secondary interactions). At room temperature, TPEs behave like crosslinked elastomers. However, at elevated temperatures, they behave as thermoplastic polymers. Thus, TPEs, unlike elastomers, have reversible properties. The reversible crosslink allows articles formed from TPE compositions to be melted and reprocessed.

TPEs compositions are typically made of a block copolymer, a thermoplastic resin and a plasticizer agent. In the case of block copolymers, styrene is frequently used as the glassy/crystalline monomer that provides physical crosslinking. Block copolymers that contain styrene are known as styrenic block copolymers, or SBCs. Examples of SBCs include SBS block copolymers (styrene-butadiene-styrene), sis block copolymers (styrene-isoprene-styrene), and SI/BS block copolymers (styrene-isoprene/butadiene-styrene). SBS, SIS, and SI/BS block copolymers can be hydrogenated to yield the hydrogenated styrenic block copolymers (HSBCs), such as SEBS (styrene-ethylene/butylene-styrene), SEPS (styrene-ethylene/propylene-styrene), and SEEPS (styrene-ethylene-ethylene/propylene-styrene).

Due to the increasingly rigorous market demands (cost reduction, quality improvement, safety and environmental requirements), TPEs have been widely used in applications which have traditionally employed vulcanized or silicon based rubbers, which are either non-reprocessable, non-recyclable or too expensive.

In particular in the medical and healthcare industry, articles made from TPE compositions, such as pharmaceutical seals and medical stoppers or penetrable septa, show important advantages over those made of compositions using "traditional" materials, such as natural rubber, butyl or halobutyl rubber or silicone based rubber.

Important requirements that TPEs should meet when intended for medical applications are: reprocessability, reduction of cycle times comparative to vulcanized materials, elastic behaviour, which translates in increased resistance to fracture and resealability, free of toxic solvents which result from traditional vulcanization processes and non-alergenic as compared to natural rubber.

Further critical properties that should be taken into account when considering the use of TPEs in medical applications are low hardness, resistance to compression, chemical resistance, reduced permeability to oxygen, resistance to sterilisation, high melt flow rate, resealability, reduced oil bleeding and fracture resistance after puncture.

It has been found that prior art styrenic block copolymers cannot provide TPE compositions with the desired balance of properties, i.e. processability, resealability, permeability, hardness, chemical resistance, resistance to sterilisation, oil bleeding and puncture resistance. It would, thus, be desirable to be able to provide styrenic block copolymers which would overcome such limitations.

U.S. Pat. No. 4,664,275 (Terumo Corp.) discloses a stopper for hermetically sealing an opening of a medical container. In order to impart good flowability the composition contains a thermoplastic resin. The composition comprises: 30 to 80% by weight of a partially cross-linked butyl rubber; 10 to 40% by weight of a thermoplastic resin; and plate-like 5 to 50% by weight of an inorganic powder, which reduces permeability to Oxygen, but as an undesirable consequence increases hardness. The disclosed stopper material is partially vulcanized and, therefore, can be recovered and reused for injection moulding again without incineration, however resulting in compression Set values higher than expected.

GB2445483 (Bespak PLC) discloses a thermoplastic alloy for a seal for a valve for use in a pharmaceutical dispensing device, comprising: (a) an elastomeric component; (b) a thermoplastic component; and (c) a sensitisor. The benefits of using alloyed blended materials include elasticity and low hardness. The disclosed thermoplastic alloy is vulcanized and, therefore, is not reprocessable.

U.S. Pat. No. 8,877,855 (West Pharma) discloses a TPE composition with at least one filler with applicability in the production of articles such as penetrable septa and caps for medical bottles. In particular, in example 2, it discloses TPE compositions (E-without filler and F-with filler) comprising high molecular weight linear SEBS block copolymer, Krato® G1633 with a number average weight of at least about 200,000 Daltons and which is commercially available. The high viscosity of the linear SEBS used, requires large ratios of oil in order to provide a processable TPE and reduce hard ness. However, the sample without filler does not meet resealability properties as reported in table 3 therein.

WO2011040586 (Kuraray Co., Ltd) discloses a thermoplastic elastomer composition comprising: 100 parts by mass of (a) a hydrogenated block copolymer that is a hydrogenated product of a block copolymer containing (A) a polymer block containing a structural unit derived from an aromatic vinyl compound and (B) a polymer block containing a structural unit derived from isoprene or a mixture of isoprene and butadiene, having a total content of a 3.4-bond unit and a 1.2-bond unit of 45% or more, has a peak top molecular weight (Mp) obtained by gel permeation chromatography in terms of polystyrene standard of from 250,000 to 500,000; from 10 to 300 parts by mass of (b) a softening agent; and from 5 to 200 parts by mass of (c) a polyolefin resin. This composition displays a very high viscosity, and thus requires large ratios of oil (softening agent) in order to provide a processable TPE composition, approximately 1.5 to 1.6 [oil/SBC] ratio.

EP 2 489 688 BI (Dynasol) discloses high-molecular weight hydrogenated styrene-butadiene block copolymers of linear or radial structure that may be obtained by anionic polymerization of a block copolymer comprising at least two aromatic vinyl monomer blocks and one conjugated diene monomer block, and subsequent hydrogenation; characterized in that it has a vinyl content of less than 60%, a molecular weight of between 200,000 and 600,000, and a viscosity of less than 300 cps. Specifically, it discloses SEBS-1, a high-molecular-weight hydrogenated radial styrene-butadiene block copolymer having a molecular weight (Mpeak SEBS) between 420000 and 575,000, coupled with $SiCl_4$, and a vinyl content less than 45%. The polymers are mixed into compositions which are then vulcanized to improve resistance to compression at higher temperatures. Although it provides acceptable products, there is still a need for improved polymers which can provide TPEs not vulcanized with an improved balance of properties such as lower viscosity for TPE compositions with lower oil content and lower permeability to oxygen.

There is therefore a need for improved polymers which can provide improved properties or easier manufacturing procedures.

SUMMARY OF THE INVENTION

The present invention provides new hydrogenated styrenic block copolymers with improved performance in TPE compositions.

In particular, the aim of the present invention is to provide new hydrogenated stryenic block copolymers, for non-vulcanized or vulcanized TPE compositions with improved processability, resealability, low permeability to oxygen, minimized oil bleeding, while maintaining adequate hardness, dimensional stability, chemical resistance and resistance to sterilisation. The copolymers of the invention provide TPEs with a good balance of key properties, e.g. melt flow rate and permeability to oxygen.

The solution provided is based on that the present inventors have identified that a hydrogenated styrenic block copolymer, with radial structure, a vinyl content of at least 60%, and a molecular weight, expressed as Mpeak, between 300,000 and 600,000 g/mol has a surprisingly low viscosity when compared with those of the prior art, and consequently improved performance in TPE compositions in terms of processability.

Accordingly, a first aspect of the present invention relates to a hydrogenated styrenic block copolymer (hydrogenated styrenic block copolymer of the invention) characterised in that it is radial, has a molecular weight, expressed as Mpeak, between 300,000 and 600,000 g/mol, a vinyl content of at least 60%, i.e. equal to or more than 60% and a viscosity, expressed as Brookfield viscosity at 5% by weight in toluene, of less than 100 cps.

A second aspect of the present invention relates to a process for preparing the hydrogenated styrenic block copolymers according to the invention, characterized in that it comprises the steps of:
  a) anionically polymerizing a block copolymer comprising an aromatic vinyl monomer block and a conjugated diene monomer block in the presence of a polar modifier in sufficient amount to reach the required vinyl content;
  b) coupling the above polymerized block copolymer with a coupling agent; and
  c) hydrogenating the product obtained in step b).

The hydrogenated styrenic block copolymers obtainable by the above process have distinct improved properties with respect to the prior art (e.g. EP 2 489 688 BI) and are also part of the present invention.

A third aspect of the invention relates to a thermoplastic elastomer (TPE-S) composition (thermoplastics elastomer composition of the invention) characterized in that it comprises:
  a) at least one hydrogenated styrenic block copolymer of the invention;
  b) at least a thermoplastic resin; and
  c) at least a plasticizer agent.

A fourth aspect of the invention relates to a method for producing an article characterized in that it comprises injection moulding or extrusion moulding or press moulding the thermoplastic elastomer composition of the invention.

A fifth aspect of the invention relates to an article characterized in that it comprises a thermoplastics elastomer composition of the invention.

The copolymer of the invention is capable of forming TPE compositions with improved properties, such as improved oxygen barrier and reduced toxicity, while not requiring vulcanization, although it can be vulcanized as reprocessable dynamically vulcanized TPS-VD if required with crosslinking agents and co-agents.

The advantages of the hydrogenated styrenic block copolymers of the present invention are essentially due to their viscosity, which is significantly lower than that of known polymers in the state of the art. This low viscosity of the hydrogenated styrenic block copolymers according to the invention provides reprocessable TPE-S compositions with improved properties, such as improved processability, good resealability, low permeability to oxygen, minimized oil bleeding, while maintaining an adequate hard ness, dimensional stability, chemical resistance and resistance to sterilisation, and reduced toxicity.

Because thermoplastic elastomers do not employ any curing agents such as Sulphur, or zinc, there are no reactive residuals left after manufacturing, so finished parts do not require washing before being used.

Definitions

Prior to a discussion of the detailed embodiments of the invention is provided a definition of specific terms related to the main aspects of the invention.

In the present invention molecular weight (Mpeak) is expressed as the molecular weight of the peak of the radial styrene-ethylene/butylene-styrene block copolymer, as determined by GPC (Gel Permeation Chromatography), using internal radial styrene-butadiene-styrene block copolymer constants (Mark-Houwink k=0.000257 and alpha=0.717) and calibrated with polystyrene standards. 15 mg sample is dissolved in 10 ml THF as solvent, and injecting 1 ml/min at 30-355 C using GPC columns PL-Gel Mixed-C PL1110-6500. Detectors: IR model 2414 and UV/Visible model 2489. Number of arms is reported as n=(Mpeak/Marm) and coupling efficiency as a ratio (Mpeaks area/non-coupled arm).

Thermoplastic is understood to mean a polymer that is plastic or deformable at ambient temperature, melts when heated and becomes hardened in a vitreous state when sufficiently cooled. Most thermoplastics are high-molecular-weight polymers, whose chains are connected by means of weak Van der Waals forces, strong dipole-dipole interactions and a hydrogen bond, or even stacked aromatic rings.

Elastomer is understood to mean a substance that may be stretched at ambient temperature to at least twice its original length and, when the stretching force ceases, said compound is capable of returning to approximately its original length in a short period of time.

The Brookfield viscosity is the apparent viscosity in centipoises (cps), determined by the Brookfield viscometer at room temperature, which measures the torque required to rotate a spindle at constant velocity in a polymer solution in toluene. The method used in the present invention is based on the method of the American Society for Testing and Materials ASTM 2196; used to measure oil viscosities at low temperatures. VB % reported values VB5% and VB10% are referred to 5% w/w and 10% w/w polymer solutions.

The method selected to determine the material's recovery capacity is the compression set method in accordance with standard ASTM D395 (method B: compression set under constant deflection). The compression sets are intended to measure the ability of rubber compounds to maintain elastic properties after the prolonged action of compression stress. Current compression tests include maintaining a defined deviation, the constant application of a known force or rapid, repeated deflections, and the resulting recovery of intermittent compression forces.

Embodiments of the present invention are described below, by way of examples only.

DETAILED DESCRIPTION OF THE INVENTION

The present invention relates to new hydrogenated styrenic block copolymers with improved performance in TPE compositions in terms of processability, resealability, low permeability to oxygen, reduced oil bleeding, while keeping low hardness, dimensional stability, chemical resistance and resistance to sterilisation.

The advantages of the hydrogenated styrenic block copolymers of the present invention are primarily due to their radial structure combined with high vinyl content. These two characteristics lead to a viscosity, which is significantly lower than that of the polymers known in the state of the art. This surprisingly significantly lower viscosity leads to an improved processability of the TPE compositions and products produced therewith.

Moreover, the reprocessable TPE-S compositions according to the present invention have the advantages of showing a low hardness and a high melt flow rate, with a reduced plasticizer/hydrogenated styrenic block copolymer ratio. This allows for the oil content in the composition to be reduced, if desired, thereby eliminating the risk of oil bleeding, while maintaining an acceptable hardness and improving the resistance to compression at room temperature. Further, the permeability to oxygen of the resulting TPEs is reduced.

The reprocessable TPE-S compositions of the present invention are especially applicable according to an embodiment of the invention for the production of medical articles, such as medical stoppers and pharmaceutical seals, such as vial seals, penetrable septa, bottle caps and plugs. The articles produced from such compositions show good reseal properties, chemical and sterilization (autoclave and radiation) resistance and reduced permeability to oxygen.

Hydrogenated Styrenic Block Copolymers

The hydrogenated styrenic block copolymers according to the present invention have a degree of hydrogenation preferably equal or greater than 97%.

The hydrogenated styrenic block copolymers of the present invention comprise more than two arms, each comprising at least one block A, primarily based on aromatic vinyl monomers, such as styrene, p-methylstyrene or tert-butylstyrene, preferably styrene, and at least one block B, primarily based on a conjugated diene, preferably butadiene.

Examples of these hydrogenated block copolymers are copolymers of general formula $[A-B]_n$ X, wherein n>2 and X is the coupling agent residue, and A is the styrenic component and B the diene component.

The aromatic vinyl monomers useful for the present invention include preferably a styrene derivative having 8 to 20, preferably 8 to 12 carbon atoms consisting of carbon and hydrogen atoms and including a styrene skeleton ($H_2C=C(H)-Ph$). Non-limitative examples are styrene, p-methylstyrene and p-tert-butylstyrene, styrene being the most preferred. They may be used by themselves or combined.

The conjugated diene monomer useful for the present invention is preferably a diene having 4 to 10 carbon atoms consisting of carbon and hydrogen atoms. Non-limitative examples are 1,3-butadiene, isoprene, 1,3-pentadiene and 2,3-dimethyl-1,3-butadiene, 1,3-butadiene being the most preferred. They may be used by themselves or combined.

In a preferred embodiment of the present invention, the hydrogenated styrenic block copolymer is a styrene-ethylene/butylene-styrene copolymer (SEBS copolymer).

Molecular Weight (Mpeak):

In a preferred embodiment of the present invention the hydrogenated styrenic block copolymers have a molecular weight, expressed as Mpeak in the range of 350,000 to 600,000 g/mol.

In another preferred embodiment of the present invention, the hydrogenated styrenic block copolymers have a molecular weight, expressed as Mpeak in the range of 350,000 to 475,000 preferably in the range of 400,000 to 475,000, more preferably in the range of 400,000 to 450,000, especially in the range of 400,000 to 425,000.

The hydrogenated styrenic block copolymers may also have a molecular weight, expressed as Mpeak in the range of 350,000 to 475,000 preferably in the range of more than 400,000 to 475,000, more preferably in the range of more than 400,000 to 450,000, especially in the range of more than 400,000 to 425,000.

Vinyl Content:

According to a further embodiment of the invention, the vinyl content is preferably between 60% and 80%, more preferably between 60% and 75%, more preferably between 60% and 68%.

Vinyl content is determined by $^1$H-NMR analysis. Experiments were conducted on a Bruker AVIII-HD 500 equipment under internal measurement conditions. Unhydrogenated copolymers were dissolved in deuterated chloroform CDCl3 (10 mg/0.5 ml) and vinyl content was reported as 1.2 bond % weight divided by total butadiene fraction.

Other Features of the Co-Polymer of the Invention

In another preferred embodiment of the invention the hydrogenated styrenic block copolymers have styrene content of 25% to 40%, preferably of about 32%.

In yet another preferred embodiment of the invention the hydrogenated styrenic block copolymers have a viscosity of less than 150 cps, preferably less than 100 cps, preferably less than 80 cps, more preferably less than 50 cps, expressed as Brookfield viscosity (BV) at 5% by weight in toluene. Typical copolymers of the invention have a viscosity of less than 40 cps, expressed as Brookfield viscosity at 5% by weight in toluene.

Preparation

The hydrogenated styrenic block copolymers of the invention can be prepared by methods analogous to those disclosed previously, for example, such as those described in EP 2 489 688 BI. It typically requires preparing first the blocks, by introducing the monomers (styrenics or styrenics/diene mixtures) in the presence of primer capable of forming the anions (e.g. n-butyllithium) and a polar modifier (e.g. (DEP) 1,2-diethoxypropane or (DTHFP) ditetrahydrofuryl propane at a concentration between 225 to 500 ppm, referred to initial volume of solvent). After the first block is prepared, the second monomer is added and polymerized in a similar way in order to obtain the second block. More blocks can be added sequentially by repeating the process. Then, the coupling agent (e.g. SiCU) is introduced in order to provide the radial copolymer. According to a preferred embodiment, the coupling agent is SiCU. When required, the live chains can be terminated by incorporating a proton-donor substance (e.g. 2,6-diterbutyl-4-methyl phenol-BHT). Hydrogenation process is completed under pressure known in the art, for example, by using a titanium metallocene catalyst in tetrahydrofuran (e.g. that disclosed in EP 2 489 688 BI) to obtain the corresponding hydrogenated block copolymers.

Thermoplastic Elastomer Composition (TPE)

In producing the TPE-S compositions of the present invention, the components for the TPE-S composition may be blended by any known method. The hydrogenated styrenic block copolymer can be first physically mixed with a plasticizer agent. Subsequently, a thermoplastic resin can be added. Optionally, stabilizers, fillers, colorants, cross-linking agents (if any) and other appropriate additives may also be added.

Hydrogenated Styrenic Block Component According to the Invention

In a preferred embodiment of the present invention, the TPE-S composition comprises less than 60 wt %, with respect to the total weight of the TPE-S composition, of at least one of the hydrogenated styrenic block component according to the invention. In another preferred embodiment of the present invention, the hydrogenated styrenic block copolymer is a styrene-ethylene/butylene-styrene copolymer (SEBS copolymer).

Thermoplastic Resin

The thermoplastic resins used in TPE-S improve the appearance of the finished product, whilst also adjusting the hardness and dimensional stability.

Preferably, the thermoplastic resin is polypropylene, homopolymer, random, block or raheco, more preferably a polypropylene homopolymer with a melt flow higher than Ig/10 at 230° C./2.16 kg, such as ISPLEN PP-070 supplied by Repsol, commercially available.

In a preferred embodiment of the present invention, the amount of thermoplastic resin in the TPE-S composition is less than 20 wt %, with respect to the total weight of the TPE-S composition. According to a further embodiment, the amount of thermoplastic resin is between 10 and 100 phr, wherein "phr" means "per hundred parts of rubber", the rubber being the hydrogenated styrenic block component, e.g. SEBS. In a further embodiment the amount of thermoplastic resin is between 15 and 45 phr.

Plasticizer Agent

The TPE-S composition further comprises a plasticizer agent as softening agent. The plasticizer agent facilitates the processability, whilst adjusting processability and hardness parameters. It assists in providing the desired reseal properties. There are many plasticizers available to the skilled person, who can choose those compatible in each case and, if required, it is acceptable for specific uses, such as pharmaceutical or cosmetic uses or food contact applications.

Preferably the plasticizer agent is a paraffinic oil compatible with the SEBS middle block, typically a white mineral oil, such as Kkristol M70 or a high molecular weight paraffinic oil, with a viscosity of 100 cps, at 405 C, having a kinematic viscosity of between 20-50,000 cSt at 40° C.; 5-1,500 cSt at 100° C. (as determined by ASTM D 445), pour point between –20° C. and 15° C. (as determined by ASTM D 97), and flash point between 170° C.-300° C. (as determined by ASTM D 92). According to a further embodiment, the white mineral oil has a kinematic viscosity from 60 to 100 cSt at 40° C. (as determined by ASTM D 445) and a flash point of 240-3005 C (as determined by ASTM D 92). According to a further embodiment, the white mineral oil has a kinematic viscosity from 60 to 100 cSt at 40° C. (as determined by ASTM D 445), for example, a commercially available such as Primol 352, Pionier 2071 or RLESA white mineral oil M70.

The amount of plasticizer agent in each case depends on the properties desired for the TPE-S composition. While it might improve processability it can also be deleterious to other properties. In yet another preferred embodiment of the invention, the plasticizer/hydrogenated styrenic block copolymer ratio in the TPE-S composition according to the invention is lower than 1.5, preferably lower than 1.0, most preferred equal to or lower than 0.5.

Further Components

The TPE-S composition of the invention may further comprise additives common to the skilled person, such as heat stabilizers, antioxidants, fillers, crosslinking agents and co-agents for TPS-VD (dynamically vulcanized styrenic thermoplastic elastomer composition), colorants and other additives in small amounts, typically up to 10 wt %, preferably less than 5 wt %, with respect to the total weight of the TPE-S composition.

Antioxidants typically used are hindered phenols. Exemplary antioxidants include those commercially known as IRGANOX® 1010, IRGANOX® 1076, and IRGANOX® 1330 from Ciba Specialty Chemicals. These antioxidants trap free radicals formed upon heating in the presence of oxygen and prevent discoloration or changes in the mechanical properties of the TPE composition.

If required the TPE-S compositions according to the invention can be vulcanized as reprocessable dynamically vulcanized TPS-VD using crosslinking agents and co-agents. Crosslinking agents typically used are crosslinking peroxides, such as dicumyl peroxide, 2,5-dimethyl-2,5-di(t-butylperoxi)hexane, or bismaleimides. Co-agents typically used are TAC (trialil isocianurato) or TAlC (trialil isocianurato).

It is also within the scope of the invention to include colorants compatible with the TPE-S composition. The colorant may be selected based on the desired overall appearance of the TPE-S composition or articles to be made therefrom. The amount of colorant included in the composition is dependent on the colour concentrate and may be determined on a case-by-case basis.

According to an embodiment of the invention, TPE-S composition of the invention comprises 100 phr of hydrogenated styrenic block component, between 10 and 100 phr of thermoplastic resin, preferably between 15 and 45 phr, between 10 and 250 phr of plasticizer, preferably between 20 and 90 phr, between 0 and 300 phr of filler and between 0 and 25 phr of other additives, wherein "phr" means "per hundred parts of rubber", the rubber being the hydrogenated styrenic block component, e.g. SEBS.

Preparation of the TPE-S

In producing the TPE-S compositions of the present invention, the components for the TPE-S composition may be blended by any known method. To obtain a homogeneous TPE composition, the above mentioned components may be dry blended, prior to melt-kneading, using a mixer, such as a Henschel mixer, a tumbler, a ribbon blender, or the like, and then melt-kneaded using a conventional kneader, such as a mixing roll, a kneader, a Banbury mixer, an extruder, or the like.

Examples of moulding methods useable for forming articles from the TPE-S composition of the present invention include injection moulding, extrusion moulding, compression moulding, blow moulding, rotational moulding, and the like. It is within the scope of the invention to produce a wide range of articles from the TPE-S compositions of the present invention, including without limitation medical devices, septa, closures, plugs, bottle caps, etc. However, the TPE-S composition according to the invention has particular applicability to the production of articles that will be subjected to both autoclaving, E-beam sterilization and puncture, such as penetrable septa and caps for medical bottles.

Examples of moulding methods usable for producing articles from TPE compositions according to the present invention include injection moulding, extrusion moulding, press moulding among others. The TPE compositions of the present invention were extruded in an Eurolab extruder L/D=25, using a temperature profile for TPE blends of 165° C. to 190° C., and a screw revolution between 150-200 rpm.

The TPE-S composition of the invention has improved properties as discussed in further detail below.

Properties

In a preferred embodiment of the present invention the reprocessable TPE-S composition has a hardness between 20 and 100° ShA, preferably between 20 and 80° ShA, more preferably between 20 and 60° ShA.

In another preferred embodiment of the present invention, the reprocessable TPE-S composition has a resistance to compression (compression set %) lower than 20%, more preferably lower than 10%, more preferably lower than 5% measured at room temperature after 22 hours compression.

In another preferred embodiment of the present invention, the reprocessable TPE-S composition has a melt flow rate between 1 and 25, more preferably between 3 and 20, most preferred between 5 and 15 M FR (g/10') at 230° C./5 kg.

While showing good resistance to chemical exposure and sterilization as well as high resealability and low oil bleeding, the TPE-S compositions of the invention still show high impermeability to oxygen and good resistance to compression. According to an embodiment of the invention, the TPE-S compositions of the invention have a permeability to O2 without fillers (cc-mil/m$^2$/day/atm) below 120,000, preferably below 70,000, more preferably below 60,000. According to a further embodiment of the invention, the TPE-S compositions of the invention have a permeability to 02 (cc-mil/m$^2$/day/atm) in the range of 30,000 and 120,000, preferably between 35,000 and 80,000, more preferably between 35,000 and 44,000. TPE-S compositions with fillers will still show a reduced permeability to oxygen, below 35,000.

EXAMPLES

The invention will be illustrated below by means of assays performed by the inventors, which demonstrate the specificity and effectiveness of the products of the present invention. More examples were completed to cover the window space vinyl % and molecular weight ranges.

Example 1: General Process for Preparing the Hydrogenated Styrenic Block Copolymers The hydrogenated styrenic block copolymers of the present invention were synthesized by the sequential anionic polymerization of the different blocks of the copolymers, in an appropriate solvent which can dissolve the monomers and is inert to the reaction, typically cyclohexane. The reaction requires an anionic initiator (also referred to as polymerization primer), for example n-butyllithium, and an ether-type substance to control the vinyl content in the butadiene fraction, known as "polar modifier" (such as DEP or DTHFP). Once the different monomers have been sequentially incorporated and the styrene-butadiene block copolymer synthesized, the block copolymer is coupled, usually with SiCl$_4$ at 70° C./20 minutes. The live chains are terminated by incorporating a proton-donor substance (e.g., 2,6-ditertbutyl-4-methyl phenol:BHT). Once the termination step is completed, the hydrogenation is performed in the presence of a hydrogenation catalyst, for example, a titanium metallocene catalyst, controlling the temperature, the pressure and the hydrogen consumption flow rate during the hydrogenation.

Polar modifiers adequate for the purposes of the present invention are, for example, 1,2-diethoxypropane (DEP) or ditetrahydrofuryl propane (DTHFP), preferably DTHFP. According to an embodiment of the invention the concentration of polar modifier is comprised between 225-500 ppm referred to initial volume of solvent, preferably cyclohexane.

According to an embodiment of the invention, the coupling agent:polymerization primer molar ratio is comprised between 0.1 and 0.8, preferably between 0.2 and 0.6, most preferred between 0.25 and 0.40.

The temperature of the reaction is typically comprised between 20° C. and 150° C., preferably between 40° C. and 100° C. In an embodiment of the invention, the reaction is initiated at a temperature of 50° C.

Example 1.1: SEBS-1, -2, -3, -4 and -5-High Molecular Weight, High Vinyl Content, Radial Styrene-Ethylenebutylene-Styrene Copolymer (SEBS Copolymer)

For preparing SEBS-1 the following were introduced into a stirred reactor (CSTR): cyclohexane (6,509 g) as the solvent, styrene (1,344 g of a 25% by weight solution) as the monomer (9% solids), n-butyllithium (30 ml, of a 2.4 wt % n-butyllithium solution) as the primer and a polar modifier (DTHFP) in a sufficient concentration (higher than 225 ppm) to reach the target vinyl levels. The polymerization is allowed to take place at a starting temperature of 50° C., with the total time of the step never being greater than 30 minutes, controlling the temperature peak associated with the polymerization of styrene. Once the polymerization of styrene is concluded, butadiene (682 g) is added to the reactor and the polymerization is allowed to take place for a time determined as 10 minutes after the maximum temperature peak. Once the polymerization of butadiene is concluded, the coupling agent (silicon tetrachloride) is added in a 0.35 molar ratio with respect to active lithium and the coupling reaction is allowed to take place at a temperature range between 70° C.-90° C. for 20 minutes. subsequently, the live chains are terminated by incorporating a proton-donour substance (BHT) to the reaction medium. Once the termination step is completed, the hydrogenation is performed in the presence of a titanium metallocene catalyst [mmol catalyst/100 g butadiene ratio: 0.45], controlling the temperature (90° C.), the pressure (10 kg/cm$^2$) and the hydrogen consumption flow rate during the hydrogenation.

The synthesis of SEBS-2, SEBS-3, SEBS-4 and SEBS-5 was analogous to that of SEBS-1 except for the following parameters: n-butyllithium concentration, styrene monomer charge and polar modifier concentration (DTHFP). The values in each case where the following:

- SEBS-2: n-butyllithium concentration (2.4 wt %): 27 ml; styrene monomer charge: 1,018 g of a 25% by weight solution; butadiene monomer charge: 763 g; polar modifier concentration: 250 ppm;
- SEBS-3: n-butyllithium concentration (2.4 wt %): 33 ml; styrene monomer charge: 1,588 g of a 25% by weight solution; butadiene monomer charge: 621 g; polar modifier concentration: 300 ppm;
- SEBS-4: n-butyllithium concentration (2.4 wt %): 27 ml; styrene monomer charge: 1,303 g of a 25% by weight solution; butadiene monomer charge: 692 g; polar modifier concentration: 225 ppm;
- SEBS-5: n-butyllithium concentration (2.4 wt %): 18.6 ml; styrene monomer charge: 1,059 g of a 25% by weight solution; butadiene monomer charge: 753 g; polar modifier concentration: 225 ppm.

The hydrogenated styrenic block copolymers so prepared were SEBS block copolymers having a molecular weight (M peak) between 360,000 and 511,000 g/mol, preferably between 400,000 and 425,000, a polydispersity index of about 2.0, an average coupling degree between 3.0 and 3.5, a coupling percentage higher than 60% a styrene content between 25 and 40%, preferably of about 32%, a styrene content in the block of about 95%, a vinyl content above 60% and almost fully hydrogenated, more than 98%. The following Table 1 summarizes the properties of the SEBS obtained.

TABLE 1

Summary of the characteristics of the synthesized SEBS block copolymers

| Sample | SEBS-1 | SEBS-2 | SEBS-3 | SEBS-4 | SEBS-5 |
|---|---|---|---|---|---|
| Styrene % | 32 | 25 | 39 | 32 | 26 |
| Vinyl % | 60 | 66 | 69 | 60 | 62 |
| Hydrogenation % | 99 | 99 | 99 | 99 | 99 |
| Mpeak | 400,000 | 443,000 | 360,000 | 440,000 | 511,000 |
| Coupling % | 70% | 67% | 66% | 65% | 67% |
| Average coupling degree | 3.4 | 3.0 | 3.5 | 3.4 | 3.4 |
| BV-5% cps | 15 | 18 | 12 | 32 | 34 |
| BV-10% cps | 140 | 176 | 132 | 572 | 624 |

Comparative SEBS Copolymers

Ref. 1: Corresponds to the SEBS-1 disclosed in EP 2 489 688 BI.

Ref. 2: A similar product as Ref. 1 was prepared, but using a mixture of styrene and p-methyl-styrene, where p-methyl styrene final content was 9% and styrene content was 21%.

Ref 3: Is the commercial product KRATON® G1633, a high molecular weight linear SEBS.

Example 2: Structural Properties and Brookfield Viscosity

The structural properties of SEBS-1 and SEBS-2 according to the present invention, as well as those of Ref. 1, Ref. 2 and Ref. 3 are summarized in Table 2 below, which also includes their Brookfield viscosity in toluene solution at concentrations of 5% and 10% by weight, at room temperature, using a Brookfield Synchro-lectric Mod. DVII viscometer.

TABLE 2

Structural properties and Brookfield viscosity (BV) of linear and radial, high-molecular weight SEBS grades

| Sample | Ref. 1 SEBS radial | Ref. 2 SEBS radial | Ref. 3 SEBS linear | SEBS-1 radial | SEBS-2 radial |
|---|---|---|---|---|---|
| Styrene % | 32 | 21 | 32 | 32 | 25 |
| Vinyl % | 38 | 38 | 40 | 60 | 66 |
| Hydrogenation % | 99 | 99 | 99 | 99 | 99 |
| Mpeak | 428,000 | 405,000 | 310,000 | 400,000 | 443,000 |
| Coupling % | >60% | >60% | n.a | >60% | >60% |
| Average coupling degree | 3.4 | 3.0 | n.a | 3.5 | 3.5 |
| p-methyl Styrene Content (%) | n.a | 9 | n.a | n.a | n.a |
| BV-5% cps | 175 | 130 | 440 | 15 | 18 |
| BV-10% cps | 7775 | 6585 | n.a | 140 | 176 |

Ref. 1, Ref. 2 and Ref. 3 are as described above (see comparative SEBS).

Table 2 demonstrates that radial SEBS copolymers having a high vinyl content and a high molecular weight according to the invention show significantly lower viscosity in solution, than those reported in the art, concretely, all resulted in Brookfield viscosities at 5% below 50 cps Example 3: Reprocessable TPE-S Compositions Example 3.1: TPE-S1

To demonstrate effect of the new hydrogenated styrenic block copolymers on hardness and resistance to compression, a TPE composition comprising SEBS-1 (TPE-S1) was prepared and compared to several reference TPE compositions comprising different SEBS copolymers (radial and linear), with the same proportion of styrene/butadiene as SEBS-1.

All compositions comprised the same type and amount of polypropylene (PP ISPLEN 070) and white paraffinic mineral oil (M70).

TABLE 3

Hardness and resistance to compression (compression Set %) for TPE compositions with different SEBS copolymers.

| TPE composition | SEBS % | PP-070 % | % M70 (White oil) | Hardness (° ShA) | C. Set % Room Temp. | Melt flow rate MFR 230° C./5 kg |
|---|---|---|---|---|---|---|
| TPE-S1 (SEBS-1) | 45 | 10 | 45 | 20 | 4 | 25 |
| Ref. 1 TPE with SEBS radial Comparative | 45 | 10 | 45 | 46 | 11 | 2.8 |
| Ref. 2 TPE with SEBS radial Comparative | 45 | 10 | 45 | 39 | 17.5 | 1.8 |

TABLE 3-continued

Hardness and resistance to compression (compression Set %) for TPE compositions with different SEBS copolymers.

| TPE composition | SEBS % | PP-070 % | % M70 (White oil) | Hardness (° ShA) | C. Set % Room Temp. | Melt flow rate MFR 230° C./5 kg |
|---|---|---|---|---|---|---|
| Ref. 3 TPE with SEBS linear Comparative | 45 | 10 | 45 | 40 | 19 | 1.2 |

Ref. 1, Ref. 2 and Ref. 3 are as described above (see comparative examples).

As it can be appreciated from Table 3 the hardness of the TPE-S composition comprising the radial, high molecular weight, high-vinyl content SEBS copolymer according to the invention, SEBS-1 (TPE-SI), is significantly reduced. Moreover, at room temperature, the resistance to compression is significantly lower, comparing with the other reference compositions. At higher temperatures the compression set % has acceptable values for commercial use.

Further, it can be seen that the melt flow rate of the TPE-S composition is significantly improved when the new SEBS-1 copolymer is used.

Example 3.2: TPE-SO

Given the low hardness of the TPE-SI composition with this new SEBS-1 copolymer, and its high melt flow rate, a second TPE-S composition was prepared comprising the said SEBS-1 copolymer and a much lower amount of oil (TPE-SO) (see Table 4)

TABLE 4

TPE-S compositions comprising the new radial high-vinyl content hydrogenated styrenic block copolymers

| TPE-S composition | SEBS % | PP-070 % | % M70 (White oil) | Ratio Oil/SEBS | Hardness (° ShA) | C. Set % Room Temp. | Melt flow rate MFR (g/10') 230° C./5 kg |
|---|---|---|---|---|---|---|---|
| TPE-S 1 | 45 | 10 | 45 | 1 | 20 | 4 | 25 |
| TPE-S 0 | 57 | 14 | 29 | 0.5 | 55 | 3 | 6.5 |

Table 4 shows that the TPE-S compositions of the present invention (TPE-SI and TPE-SO) can be prepared with a much lower amount of oil, while maintaining an acceptable hardness and a good resistance to compression, especially at room temperature, improving barrier properties to oxygen and keeping good dimensional stability.

Example 4: Properties of the TPE-S Compositions of the Present Invention

The TPE-S compositions according to the invention (TPE-SI and TPE-SO) also show good chemical and sterilization resistance, low permeability to oxygen, and good resealability as compared to others produced from TPE compositions based on radial or linear reference SEBS copolymers. The results of the assays performed to evaluate these properties are summarized in Table 5 below.

TABLE 5

Summary of the properties of reprocessable TPE-S compositions according to the invention and of reference compositions based on radial and linear SEBS

| | TPE compositions | TPE-S0 | TPE-S1 | Ref. 1 | Ref. 2 | Ref. 3 |
|---|---|---|---|---|---|---|
| Hardness | ° ShA | 55 | 20 | 46 | 39 | 40 |
| C. set % | T. room/22 h | 3 | 4 | 11 | 17 | 19 |
| Chemical resistance | Boiling $H_2O$, EtOH 20% and Acetic Acid 3% | ok | ok | ok | ok | ok |

TABLE 5-continued

Summary of the properties of reprocessable TPE-S compositions according to the invention and of reference compositions based on radial and linear SEBS

| TPE compositions | | TPE-S0 | TPE-S1 | Ref. 1 | Ref. 2 | Ref. 3 |
|---|---|---|---|---|---|---|
| Average Permeability to $O_2$ | cc-mil/m$^2$/day/atm | 43,500– | 96,000 | 85,000 | 92,000– | 99,000 |
| Sterilization resistance | Autoclave | ok | ok | ok | ok | ok |
| | E-beam | ok | ok | ok | ok | ok |
| Resealability | | ok | ok | ok | ok | ok |
| Oil Bleeding | 50° C., 10 days | ok | ok | ok | ok | ok |
| Oil | % | 29 | 45 | 45 | 45 | 45 |

Ref. 1, Ref. 2 and Ref. 3 are as described above (see comparative examples)

Chemical Resistance Assays

As for commercial stoppers, the chemical resistance of the produced materials was tested with boiling water, ethanol 20% and acetic acid 3%. No significant changes in hardness, weight or dimension were observed.

Permeability to $O_2$ and Sterilization in Autoclave Assays

Permeability to O2 was tested before and after sterilization in autoclave with H2O steam under pressure, using an oxygen transmission rate (OTR) testing system OX-TRAN® Model 2/21 with room temperature mask. The samples were compression moulded into plaques of 2 mm thickness and tested before and after sterilization in autoclave (Streriflow model Barrinquand) at 120° C., 2.8 bar and approximately 30 minutes cycles.

Plaques based on the new SEBS copolymer and with approximately half of the oil content (TPE-SO composition) show lower permeability values (43,000-44,000 cc-mil/m$^2$/day/atm), approximately half of the permeability reported for plaques based on TPE-S1 composition.

Resistance to Sterilization with Ionizing Radiation

E-beam radiation was used at a maximum dose of 75 kGy. The procedure was performed according to Iso 11137.

After sterilization mechanical and optical properties were evaluated.

Samples based on TPE-S1 and TPE-S0 showed a good resistance to sterilization with a good resistance to breakage when stretched and 100%, all with a retention above 90% of the initial value after 3 cycles of 25 kGy. Samples with a lower oil content (TPE-S0 compositions) show a higher modulus.

For testing optical properties, such as colour change, a disc of pure polypropylene homopolymer sample was included in the assay. After three radiation cycles of 25 kGy this polypropylene disc showed a light yellow colouration. This colouration was not significant for the discs based on the TPE-S compositions according to the invention.

In conclusion, articles based on the TPE-S compositions according to the invention have a good resistance to sterilization by ionizing radiation.

Melt Flow Rate

The melt flow rate was determined according to UNE-EN ISO 1133, in a CEAST 17111 system, according to the gravimetric method at 230° C./5 Kg over a chaff SEBS/Polypropylene/Oil.

As it can be seen from table 3, composition TPE-S1 based on the new SEBS-1 copolymer has a significantly higher melt flow rate (25 g/10') as compared with the other TPE compositions. As referred above, this high melt flow rate allowed the reduction of the oil content (TPE-S0), thus adjusting the melt flow rate to comparable values of commercial medical stoppers (as reported in table 4). Nevertheless, the TPE-S0 composition has a very good melt flow rate when compared to that of seals found in commercial catalogues.

Resealability 500 ml bottles with stoppers of 2 mm thickness and 26 mm diameter are used as septum. Deionized water is used and the assay is performed at room temperature. TPE-S1 and TPE-S0 are tested and both show good resealability The septa are penetrated with a 1.26 mm section needle, the bottles are inverted and left in a holder so that the water exerts pressure on stopper. After 24 hours, no leakage was observed.

The septa were then penetrated three times. Also in this case no leakage was observed after 24 hours, fact that indicates a good resealability of the referred septa.

Oil Bleeding

Discs based on compositions TPE-S1 and TPE-SO were produced. The discs were left in the oven for 10 days, at 50° C., on absorbent paper so that their weight difference (discs were weighted before and after the experiment) and the visual evaluation of the paper could give a clear indication of oil bleeding.

In none of the cases assayed with TPE-S1 and TPE-SO occurred oil bleeding.

Therefore, the copolymers of the invention can be used in TPE compositions with a reduced oil bleeding (even allowing a reduction of the oil content) while maintaining other properties of the TPE, or even improving them (e.g. impermeability to oxygen).

The invention claimed is:

1. A hydrogenated styrenic block copolymer, wherein the copolymer is radial, has a molecular weight, expressed as Mpeak, between 300,000 and 475,000 g/mol, a vinyl content of between 60% and 69%, has a styrene content of 25% to 40%, a viscosity, expressed as Brookfield viscosity at 5% by weight in toluene, of less than 32 cps, and has a general formula [A-B]$_n$X, wherein A is a block based on aromatic vinyl monomers which are a styrene derivative having 8 to 20 carbon atoms, B is a block based on conjugated diene monomers having 4 to 10 carbon atoms, n>2 and X is a coupling agent residue, wherein the coupling agent is silicon tetrachloride SiCl$_4$, and wherein the hydrogenated styrenic block copolymer has an average coupling degree from 3.0 to 3.5.

2. The hydrogenated styrenic block copolymer according to claim 1, wherein it has a molecular weight, expressed as Mpeak, of between 400,000 to 450,000.

3. A TPE-S composition, wherein it comprises;
   a) at least one hydrogenated styrenic block copolymer as defined in claim 1;
   b) at least a thermoplastic resin; and
   c) at least a plasticizer agent.

4. The TPE-S composition according to claim 3, wherein the plasticizer/hydrogenated styrenic block copolymer weight ratio is equal to or lower than 0.5.

5. The TPE-S composition according to claim 3, wherein the amount of thermoplastic resin is between 10 and 100 phr, wherein "phr" means parts per hundred of hydrogenated styrenic block component.

6. The TPE-S composition according to claim 3, wherein it has melt flow rate between 1 and 25 MFR (g/10') at 230° C./5 kg.

7. An article wherein it comprises a TPE-S composition as defined in claim 3.

8. The article according to claim 7, wherein it is selected from the group consisting of medical devices, stoppers, closures, plugs, bottle caps/seals, vial seals and penetrable septa.

9. The TPE-S composition according, to claim 4, wherein the amount of thermoplastic resin is between 10 and 100 phr, wherein "phr" means parts per hundred of hydrogenated styrenic block component.

10. The TPE-S composition according to claim 3, wherein it has melt flow rate between 5 and 15 MFR (g/10') at 230° C./5 kg.

11. The hydrogenated styrenic block copolymer according to claim 1, wherein its coupling % is 65% or greater.

12. The hydrogenated styrenic block copolymer according to claim 11, wherein the coupling % is between 65% and 70%.

* * * * *